(12) United States Patent
Bartonek et al.

(10) Patent No.: US 7,609,497 B2
(45) Date of Patent: Oct. 27, 2009

(54) RESIDUAL-CURRENT-OPERATED PROTECTIVE DEVICE

(75) Inventors: Michael Bartonek, Vienna (AT); Gerhard Dobusch, Vienna (AT)

(73) Assignee: Moeller Gebäudeautomation GmbH, Schrems (AT)

( * ) Notice: Subject to any disclaimer, the term of this patent is extended or adjusted under 35 U.S.C. 154(b) by 0 days.

(21) Appl. No.: 11/737,881

(22) Filed: Apr. 20, 2007

(65) Prior Publication Data

US 2007/0247773 A1 Oct. 25, 2007

Related U.S. Application Data

(60) Provisional application No. 60/745,246, filed on Apr. 20, 2006.

(30) Foreign Application Priority Data

Apr. 20, 2006 (AT) ................. A 675/2006

(51) Int. Cl.
- *H02H 3/08* (2006.01)
- *H02H 9/02* (2006.01)
- *H02H 9/04* (2006.01)
- *H02H 3/00* (2006.01)

(52) U.S. Cl. .................. 361/93.6; 361/93.1; 361/91.1; 361/44; 361/87

(58) Field of Classification Search ............... None
See application file for complete search history.

(56) References Cited

U.S. PATENT DOCUMENTS

| | | | |
|---|---|---|---|
| 6,697,244 B1 | 2/2004 | Bauer et al. | |
| 7,068,047 B2 * | 6/2006 | Ward | 324/606 |

FOREIGN PATENT DOCUMENTS

| | | |
|---|---|---|
| DE | 38 23 099 A1 | 1/1990 |
| DE | 0570603 A1 | 11/1993 |
| DE | 19842470 A1 | 3/2000 |
| EP | 1 478 070 A1 | 11/2004 |
| GB | 2 176 069 A | 12/1986 |
| WO | WO 2006/007608 | 1/2006 |

OTHER PUBLICATIONS

Bauer Bernhard Dipl-ing; Fail safe differential current circuit breaker; Nov. 24, 1993; Fig. 1.*

* cited by examiner

*Primary Examiner*—Albert W Paladini
*Assistant Examiner*—Dharti Patel
(74) *Attorney, Agent, or Firm*—Henry M. Feiereisen; Ursula B. Day

(57) ABSTRACT

A switching device for disconnecting and switching at least one line of a power supply is disclosed. The switching device may be, for example, a residual-current-operated protective device or a combination switch and includes a line-voltage-independent trigger device, a trigger element, such as a trigger relay, associated with the line-voltage-independent trigger device, as well as a line-voltage-dependent trigger device. The line-voltage-dependent trigger device has means for triggering the trigger element that is associated with the line-voltage-independent trigger device. The switching device has a simple construction, a reduced number of components, and also an enhanced functional reliability compared to a conventional switching device.

17 Claims, 5 Drawing Sheets

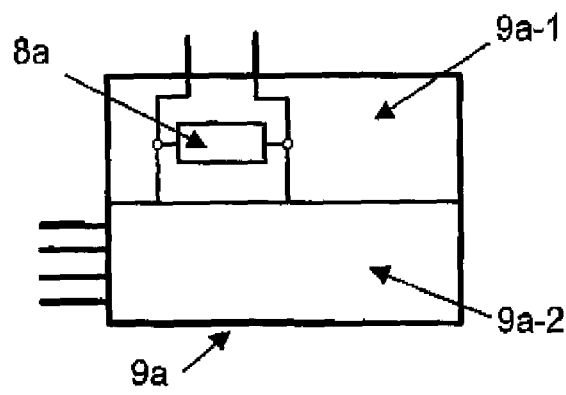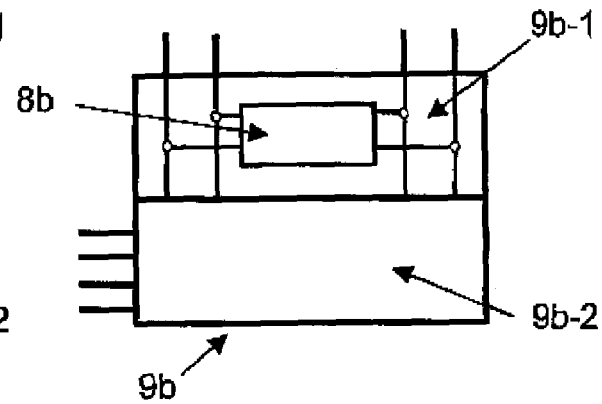
Fig. 5a　　　　　　　　　Fig. 5b
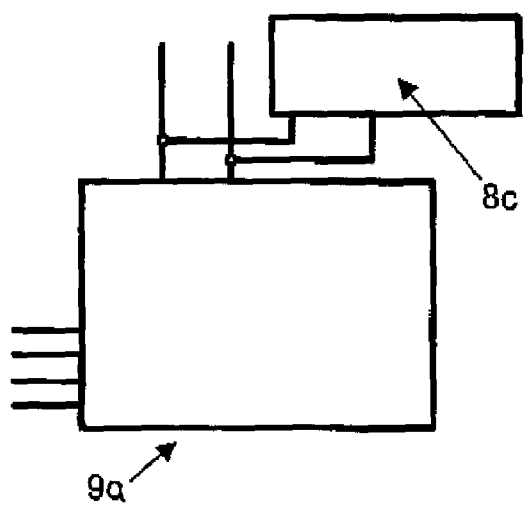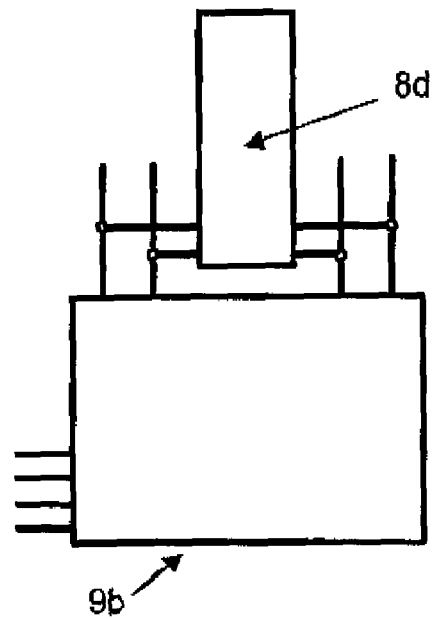
Fig. 5c　　　　　　　　　Fig. 5d

RESIDUAL-CURRENT-OPERATED PROTECTIVE DEVICE

CROSS-REFERENCES TO RELATED APPLICATIONS

This application claims the benefit of prior filed U.S. provisional Application No. 60/745,246, filed Apr. 20, 2006, pursuant to 35 U.S.C. 119(e), and claims the priority of Austrian Patent Application, Serial No. A 675/2006, filed Apr. 20, 2006, pursuant to 35 U.S.C. 119(a)-(d), the contents of which are incorporated herein by reference in its entirety as if fully set forth herein.

BACKGROUND OF THE INVENTION

The present invention relates to a switching device, for example a residual-current-operated protective device or a combination switch, for disconnecting and switching at least one line of a power supply, and more particularly a switching device with an optional line-voltage-dependent switching functionality, without requiring a dedicated line-voltage-dependent trigger element.

Nothing in the following discussion of the state of the art is to be construed as an admission of prior art.

Switching equipment of this type is used in electrical engineering applications, in particular in building installations or in the home. When an undesirable condition occurs, for example a residual current, overcurrent or overvoltage, these switching devices should respond and disconnect the affected circuit from the voltage supply.

Residual-current-operated protective devices (RCDs) or combination switches (RCBOs) are classified according to their technical function as line-voltage-independent ("VI" or voltage-independent) or as line-voltage-dependent ("VD" or voltage-dependent). In accordance with conventional product standards (e.g., EN/IEC 61008, 61009, 61947, . . . ), full functionality is provided in the first case also during line voltage failure (VI); however, in the latter case only when the line voltage supply is present (VD).

The published international application WO 2006/007608 A2 discloses a FI (fault-interrupter) circuit breaker which provides voltage-independent basic functionality, but can also accommodate an optional additional module (control module) which provides additional voltage-dependent functionality. For this purpose, two trigger elements are included in the FI circuit breaker, with one of these trigger elements operating in voltage-independent mode (permanent magnetic trigger) and the other operating in voltage-dependent mode (operating current trigger) on a common latch. When the additional module is inserted and the line voltage is applied, the voltage-independent trigger is bypassed and only the voltage-dependent trigger is activated.

This switching device disadvantageously has a complex construction, because many components have to be provided twice for the voltage-independent and the voltage-dependent trigger. Because each of the two types of the triggers requires a respective dedicated trigger element, this applies particularly to those configurations where a later installation of an additional module is not contemplated.

It would therefore be desirable and advantageous to provide an improved switching device for switching a line of a power supply, which obviates prior art shortcomings and is able to specifically allow continued operation with and without an additional module having voltage-dependent functionality. Moreover, no components should have to be provided that are not already required for the pure voltage-independent operation. In addition, conventional voltage-independent switching devices should be easily adaptable, and the functional reliability should be increased in voltage-dependent operation.

SUMMARY OF THE INVENTION

According to one aspect of the invention, a switching device, for example a residual-current-operated protective device or a combination switch, for disconnecting and switching at least one line includes a line-voltage-independent trigger device, a trigger element associated with the trigger device, for example a trigger relay, as well as a line-voltage-dependent trigger device, wherein the line-voltage-dependent trigger device includes means for triggering the trigger element associated with the line-voltage-independent trigger device. The line-voltage-dependent trigger device therefore utilizes the existing trigger element of the line-voltage-independent trigger device.

The switch element can then be used selectively with or without an additional module. An additional trigger element can be eliminated even when the additional module and hence also the voltage-dependent enhanced functions are used.

According to an advantageous embodiment, the switching device may include a sum-current transformer with at least one primary winding for detecting a critical current and with a secondary winding for applying a trigger current to the line-voltage-independent trigger element. In this way, residual currents can be measured and the most often demanded line-voltage-independent trigger functionality can be ensured.

Advantageously, the sum-current transformer may include an additional tertiary winding. This can eliminate unintentional triggering, in particular with transient overvoltages and the associated secondary currents.

According to another embodiment of the invention, the line-voltage-dependent trigger device may be configured to supply an electric current to the tertiary winding. By supplying a current in the tertiary winding, a trigger control can be realized, because the magnetic flux increases in the sum-current transformer. This in turn activates the trigger element of the line-voltage-independent trigger device, for example a permanent magnet relay. The line-voltage-dependent trigger device can thereby trigger the trigger element associated with the line-voltage-independent trigger device, for example the permanent magnet relay.

According to yet another embodiment of the invention, the line-voltage-dependent trigger device may be connected between the secondary winding and the trigger element. In this case, a passive electronic trigger circuit can advantageously be provided which is connected between the sum-current transformer and the trigger relay, and which can optionally be combined with the line-voltage-dependent trigger device to form an assembly, in particular a module.

In still another advantageous embodiment of the invention, the line-voltage-dependent trigger device may be configured to supply an electric current to the trigger element. This has the advantage that the line-voltage-dependent trigger device can directly trigger the trigger element associated with the line-voltage-independent trigger device.

In a preferred embodiment, the line-voltage-dependent trigger device may be implemented as a module that is integrated to form a functional group. In this way, different embodiments with or without line-voltage-dependent functions can be readily provided. According to one embodiment, the module can be fixedly installed in the switching device.

Alternatively, in another embodiment, the module may be configured to be removable, so that it can again be plugged into the switching device, preferably via plug contacts. In the latter embodiment, an upgrade to line-voltage-dependent functions can be added later.

Advantageously, the line-voltage-dependent trigger device may be activated when a supply voltage is applied to at least one line. This advantageously allows changes from a voltage-independent operation to a voltage-dependent operation—or vice versa—to be performed automatically.

In another advantageous embodiment, the line-voltage-dependent trigger device may be activated when the voltage in the at least one line exceeds a presettable threshold value. A changeover to voltage-dependent operation can then advantageously occurs only wherein the line-voltage-dependent trigger device is fully operational.

The presettable threshold value may be between 30 and 100 V, preferably between 50 and 80 V. This ensures that the line-voltage-dependent trigger device already provides the required high safety in the event that a dangerous live voltage is present.

In yet another advantageous embodiment, the line-voltage-dependent trigger device may be deactivated when the voltage in the at least one line is less than a presettable threshold value. The switching device then operates like a pure line-voltage-independent circuit, thus always ensuring a safe operation of the switching device.

In still another advantageous embodiment of the invention, a preferably line-voltage-independent delay circuit may be provided which disables the line-voltage-dependent trigger device during a presettable time interval after its activation, preferably during 1 to 100 msec. In particular, the time required by the line-voltage-dependent trigger device during activation before it becomes fully operable can be bypassed. This reliably prevents accidental triggering during this time interval which may be caused by a line-voltage-dependent trigger device that is not yet fully operational.

Advantageously, the delay circuit may bypass the line-voltage-dependent trigger device during the presettable time interval. The line-voltage-dependent trigger device can thereby be disabled in a particularly simple manner.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5a shows a detail of an additional module with integrated line-voltage-independent electronic circuitry according to the first embodiment of the invention, FIG. 5b shows a detail of an additional module with integrated line-voltage-independent electronic circuitry according to the second embodiment of the invention, FIG. 5c shows a detail of an additional module with separate line-voltage-independent electronic circuitry according to the first embodiment of the invention, and FIG. 5d shows a detail of an additional module with separate line-voltage-independent electronic circuitry according to the second embodiment of the invention.

DETAILED DESCRIPTION OF PREFERRED EMBODIMENTS

The depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
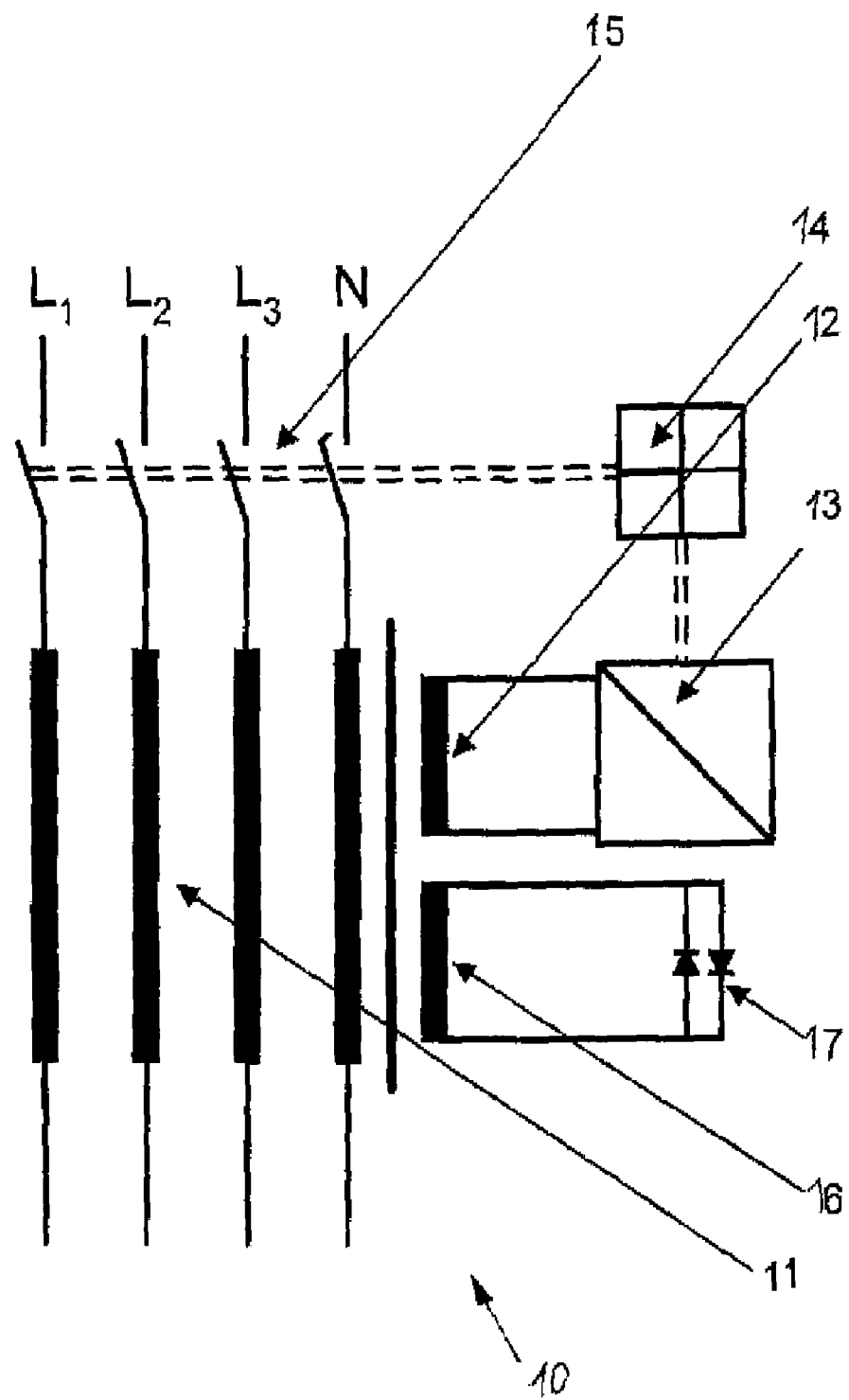
FIG. 1 shows a conventional residual-current-operated protective device with a tertiary winding.

Turning now to the drawing, and in particular to FIG. 1, there is shown a conventional residual-current-operated protective device 10 with four lines, namely the external lines $L_1$, $L_2$, $L_3$, and the neutral conductor N, a sum-current transformer 11, a secondary winding 12, a tertiary winding 16, as well as a trigger element implemented as a permanent magnet trigger relay 13. The trigger relay 13 is connected with a latch 14 which operates on the main contacts 15. When a residual current flows through any of the lines $L_1$, $L_2$, $L_3$ or N, a voltage is induced in the secondary winding 12, causing the permanent magnet trigger relay 13 to be activated and hence also activates the residual-current-operated protective device via the latch 14 and disconnects the main contacts 15.

Voltage-independent switching elements, such as the depicted FI (fault interrupter) switch, receive their trigger energy directly from the energy of the residual current via the sum-current transformer 11. Due to the extreme sensitivity of such trigger circuits, there exists always the possibility of unintentional release, e.g., when transient overvoltages and consequential currents occur. These undesirable phenomena can be eliminated, for example, by providing an additional special winding, like the tertiary winding 16 of the sum-current transformer 11 depicted in FIG. 1, which transmits magnetic field energy at high residual current amplitudes from the sum-current transformer 11 to the additional winding 16 via two antiparallel-connected diodes 17. This decreases the energy transfer to the trigger element connected to the secondary side, in this example to the permanent magnet trigger relay 13, preventing this trigger relay 13 to respond.

Figure 2:
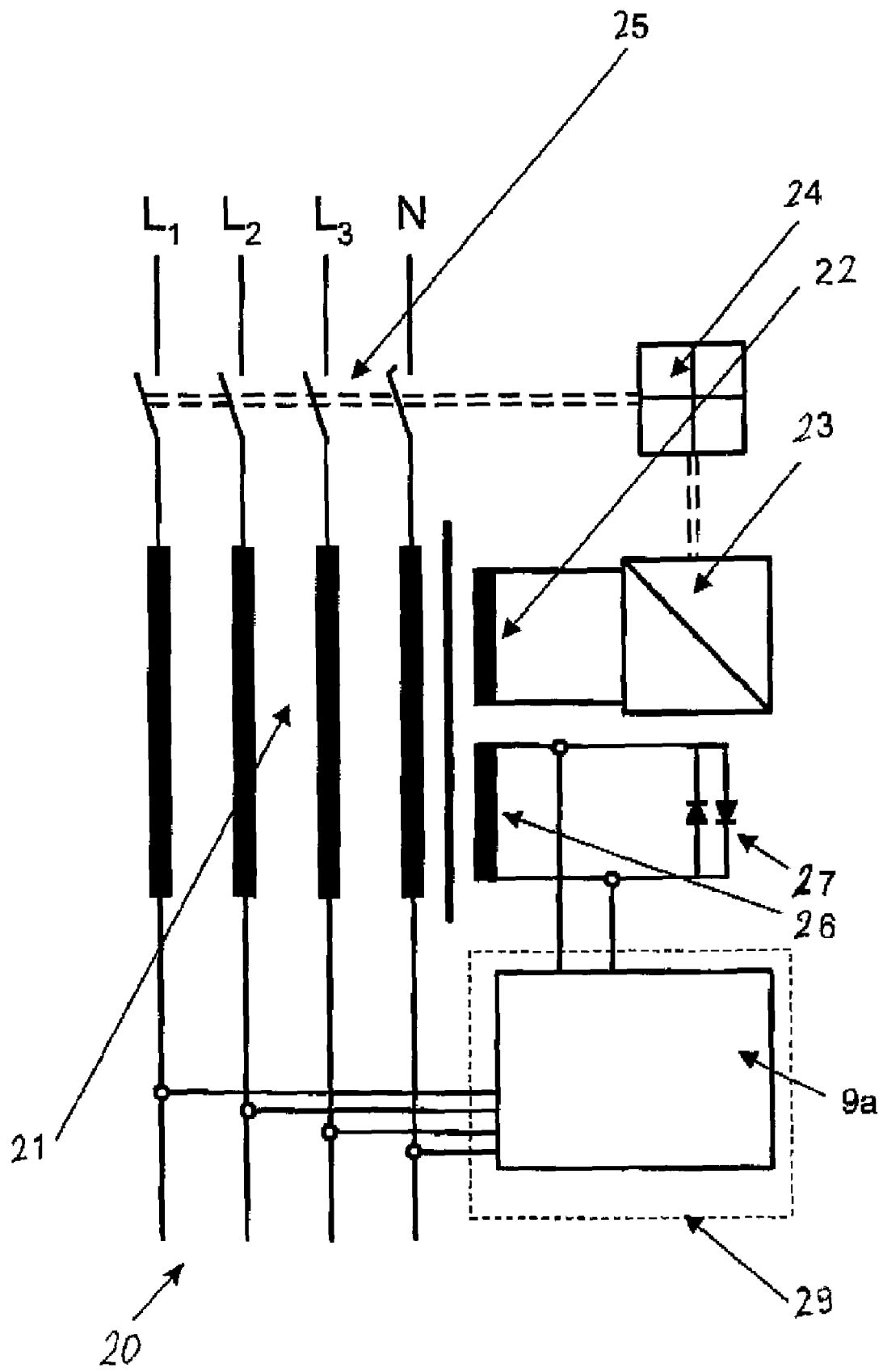
FIG. 2 shows a first embodiment of a residual-current-operated protective device according to the invention.

FIG. 2 depicts a first embodiment of a residual-current-operated protective device 20 according to the invention, having like the conventional device 10 a sum-current transformer 21, a secondary winding 22, a tertiary winding 26, and a trigger relay 23. The trigger relay 23 is connected with a latch 24 which operates on the main contacts 25. The tertiary winding 26 is herein connected to an additional module 9a providing line-voltage-dependent triggering. The same principle of controlled magnetic flux in the sum-current transformer 21 is used in the illustrated exemplary embodiment of the invention to implement the trigger control for the voltage-independent and voltage-dependent application, respectively, through high-resistance and low-resistance termination, respectively, of the tertiary winding 26. Only a single trigger relay 23, being of the same type of permanent magnet trigger relay 13 as in FIG. 1, is required. In voltage-independent operation (VI), the module input at module 9a is high-resistance, so that the module 9a does not affect the VI trigger circuits. When a minimum voltage is present at module 9a, the aforementioned input becomes low-resistance. An existing difference current induces a current in the tertiary winding 26 which is processed in module 9a (A/D transformer) and measured. When a preconfigurable threshold value is exceeded in module 9a, a test current is generated and supplied to the tertiary winding 26. Due to the large number of tertiary winding turns (for example, between 20 and 200, preferably 50 to 120, in particular 80), the increased number of Ampere-winding turns induces in the sum-current transformer 21 a greater magnetic flux, which activates the permanent magnet relay 23 in the secondary circuit via the secondary winding 22. In contrast to the line-voltage-independent use, the permanent magnet relay 23 is controlled with increased energy—in a limit situation, until the material of the sum-current transformer saturates, which improves the triggering reliability of relay 23.

By supplying the test voltage to the tertiary winding 26, the permanent magnet relay 23 can be controlled by a line-voltage-dependent trigger device 9a, so that the FI switch can be triggered without requiring a dedicated line-voltage-dependent trigger element.

Figure 3:
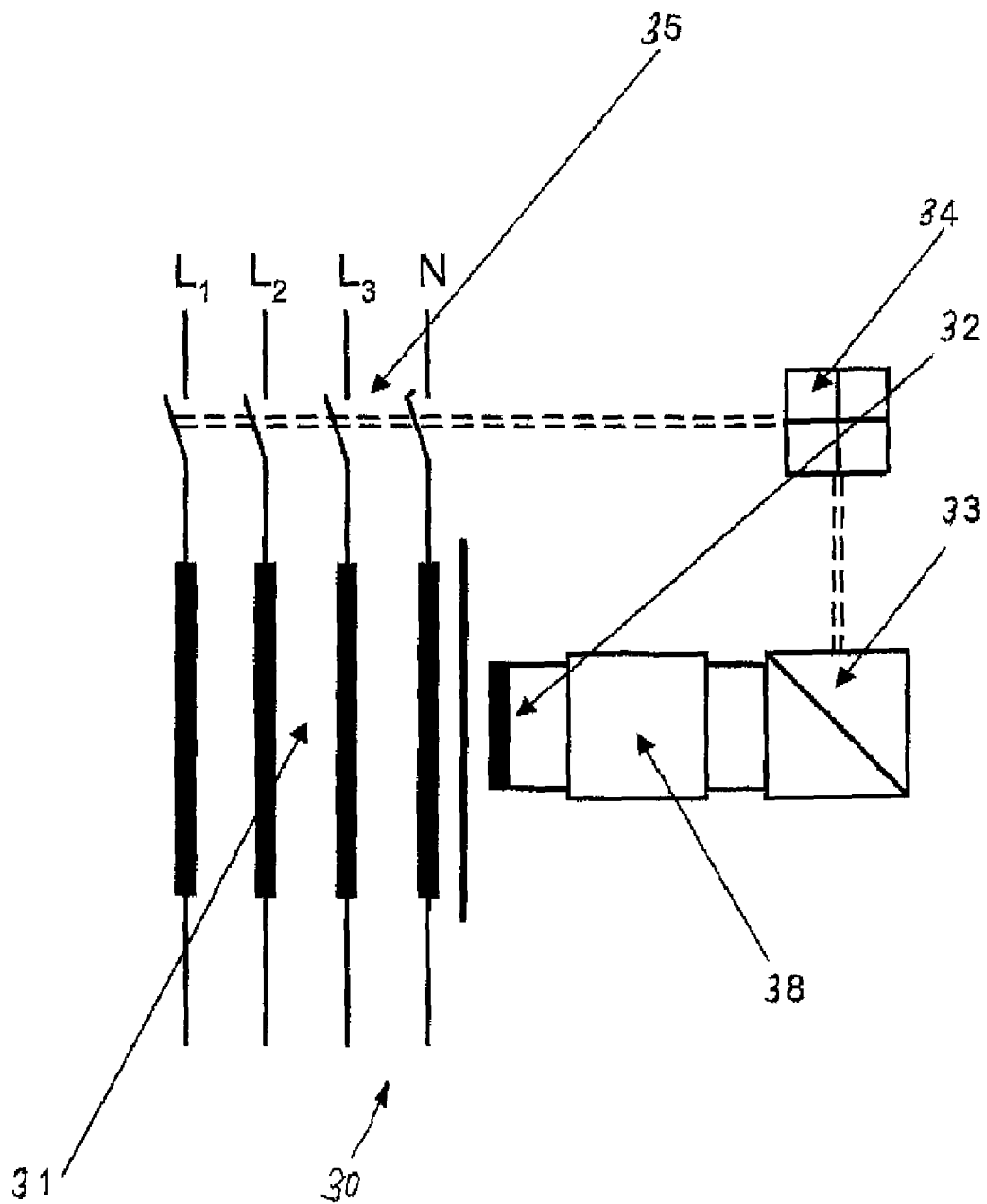
FIG. 3 shows a conventional residual-current-operated protective device with a passive circuitry providing power amplification.

In addition to the FI residual-current-operated protective device illustrated in FIG. 1, conventional triggers circuits can also be used, as illustrated in FIG. 3. The illustrated device 30 includes, as before, a sum-current transformer 31, a secondary winding 32, and a trigger relay 33. In this exemplary embodiment, a passive trigger electronic circuit 38 is connected between the sum-current transformer 31 and the trigger relay 33 to produce reliable triggering or an intentional trigger delay. The latter relates, for example, to the "S" characteristic defined in the industrial standard. The line-voltage-independent trigger element is hereby also a permanent magnet trigger relay 33 able to operate the latch 34 which operates on the main contacts 35.

Figure 4:
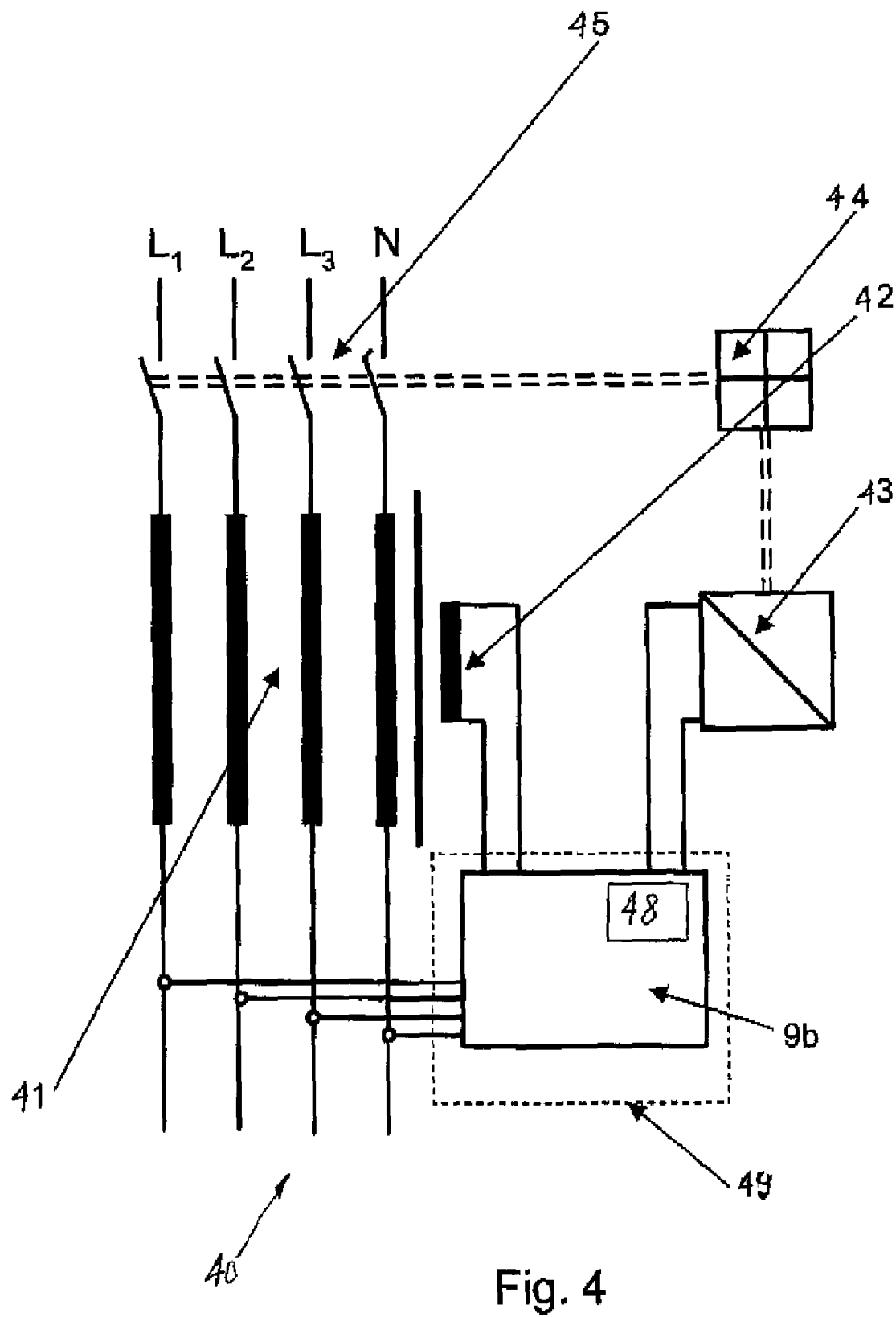
FIG. 4 shows a second embodiment of the residual-current-operated protective device according to the invention.

FIG. 4 depicts a second embodiment of a residual-current-operated protective device 40 according to the invention. The device 40 also includes a line-voltage-dependent trigger device configured to trigger the trigger element 43 associated with the line-voltage-independent trigger device, i.e., the permanent-magnet relay 43. Because a tertiary winding may not be provided, the line-voltage-dependent functions may in this second embodiment of the invention be integrated via a module 9b which has integrated therein a passive trigger electronic circuit 48 which performs a substantially similar function as the passive trigger electronic circuit 38 depicted in FIG. 3. The module 9b can hereby operate directly on the permanent-magnet relay 43 and cause triggering of the FI switch via the relay 43.

As shown by the broken line in FIGS. 2 and 4, the line-voltage-dependent additional functions may be combined in an additional module 29 and 49, respectively, which may optionally be installed and removed if so desired. Without this additional module 29, 49, the FI switch operates like a conventional switch, i.e., is configured to be exclusively voltage-independent. If the additional module 29, 49 is inserted in the switch, then the switch is complemented by the line-voltage-dependent additional functions of the component 9a (FIG. 2) and 9b (FIG. 4). According to an advantageous embodiment of the invention, the line-voltage-independent VI-trigger electronic circuit can be functionally integrated in this module 29, 49 (see, for example, FIG. 5a, Detail 8a, and FIG. 5b, Detail 8b), thereby ensuring voltage-independent operation even when the additional module 29, 49 is inserted. The module 29, 49 may then include both line-voltage-independent (VI) and line-voltage-dependent (VD) functionalities.

As illustrated in FIGS. 5a and 5b, the two functional groups for line-voltage-dependent (VD) and line-voltage-independent (VI) triggering can be installed in two spatially separate module sections. The line-voltage-independent (VI) functions are combined in module section 9a-1 of module 9a (FIG. 5a) and in module section 9b-1 of module 9b (FIG. 5b), respectively, and the line-voltage-dependent (VD) functions are combined in a module section 9a-2 of module 9a (FIG. 5a) and in module section 9b-2 of module 9b (FIG. 5b), respectively.

The voltage-dependent trigger function of the embodiment depicted in FIG. 4 will now be explained in detail: the residual current signal generated by the sum-current transformer 41 is processed by the electronic circuit 9b in module 49 and measured. When a pre-configurable threshold value is exceeded, a test current is generated in module 49 and supplied to the trigger relay 43. The signal that is present at the output of module 49 has a higher power level than the trigger signal provided by the trigger electronics 8b or 8d (see FIGS. 5b and 5d) in VI operation. This increases the trigger reliability of the inductively coupled trigger relay 43 in VD-operation.

The value of the minimum supply voltage for activating the VD functions in such hybrid module ("VIVD") is in the range of 30-100 V, preferably between 50 and 80 V.

Additional functions can be integrated in the switching device 20, 40 and the modules 29, 49, respectively. For example, an internal temperature measurement can measure excess temperature, based on which the thermal reliability of the employed electronic components in modules 29, 49 can be evaluated. For example, the device can be switched off when the temperature is too high.

In particular, different requirements for protection can be satisfied by interchanging different types of modules, while retaining the voltage-independent basic function using the same basic switch.

All types of modules allow implementation of additional functions in VD mode:

Adjustability of a threshold value of the trigger residual current (e.g., ID between 0.5 IDn and approximately 0.95 IDn), Adjustability of a trigger delay, Adjustability of an upper and/or lower limit voltage for detecting overvoltages and/or undervoltages, Determination of the power factor of the residual current, External communication channel via infrared, visible LEDs, wireless, . . .

Data interface for exchange of program codes, parameters, . . .

In another embodiment of the invention depicted in FIGS. 5c and 5d, the reliability of the switching device 20, 40 can be further improved. Because a finite time is required from the time the switching device is turned on and the full functionality of the modules 29, 49 becomes available, although this time may only be in a millisecond range, the FI residual-current-operated protective device can be accidentally triggered by transient peak currents. Such transient peak currents can occur, for example, when inductive loads are switched in. It is therefore desirable to prevent such accidental triggering during this time interval. A switching device according to the invention may therefore include a delay circuit 8c, 8d for bypassing the functionality of the module 29, 49, respectively, until the module 29, 49 is configured to prevent such undesirable triggering. Such line-voltage-independent delay circuit can either be integrated in the modules 29, 49, as indicated in FIGS. 5a and 5b, wherein the reference symbols 8a, 8b then indicate the respective delay circuits, or as a separate circuit 8c, 8d connected with the respective modules 9a, 9b, as indicated in FIGS. 5c and 5d.

For example, the functionality of module 29, 49 can be bypassed in the following manner: in the embodiment illustrated in FIG. 4, with the detail of module 9b shown in FIG.

5b, the input of module sections 9b-2 is high-resistance in line-voltage-independent VI operation, so that the function of the electronic circuit 48 is active. When the supply voltage exceeds a threshold value, the line-voltage-independent VI function transitions into the line-voltage-dependent VD function. The input of the line-voltage-dependent module section 9b-2 then becomes low-resistance, thereby bypassing the electronic trigger circuit 9b.

A bypass function can be implemented in the exemplary embodiment depicted in FIG. 2, with the detail of module 9a shown in 5a, in a similar manner.

If a trigger circuit requiring a passive circuit with power amplification, such as the passive trigger electronic circuit 38 illustrated in FIG. 3, is provided, then this circuit can also be combined with an additional delay circuit of the type illustrated in FIGS. 5b and 5d as Details 8b and 8d.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A switching device for disconnecting and switching at least one line, comprising:
   a line-voltage-independent trigger device with a line-voltage-independent electronic trigger element operating a latch that disconnects and switches the at least one line,
   a line-voltage-dependent electronic circuit receiving a voltage from the at least one line and producing a line-voltage-dependent trigger signal,
   wherein the line-voltage-dependent electronic circuit is constructed to supply the line-voltage-dependent trigger signal to the line-voltage-independent trigger device when the received voltage exceeds a presettable threshold value, and
   wherein the trigger signal supplied by the line-voltage-dependent electronic circuit to the line-voltage-independent trigger device is additive to and has a higher power than the line-voltage-independent trigger signal provided by the line-voltage-independent electronic trigger device alone.

2. The switching device of claim 1, further comprising a sum-current transformer having at least one primary winding and a secondary winding that supplies an input current to the line-voltage-independent trigger element.

3. The switching device of claim 2, wherein the sum-current transformer comprises an additional tertiary winding.

4. The switching device of claim 3, wherein the line-voltage-dependent electronic circuit is configured to supply an electric current to the tertiary winding.

5. The switching device of claim 2, wherein the line-voltage-dependent electronic circuit is connected between the secondary winding and the trigger element.

6. The switching device of claim 1, wherein the line-voltage-dependent electronic circuit is implemented as a module that is integrated into a functional group.

7. The switching device of claim 1, wherein the line-voltage-dependent electronic circuit is activated when a voltage in the at least one line exceeds the presettable threshold value.

8. The switching device of claim 7, wherein the presettable threshold value is between 30 and 100 V.

9. The switching device of claim 7, wherein the presettable threshold value is between 50 and 80 V.

10. The switching device of claim 7, wherein the line-voltage-dependent electronic circuit is deactivated when the voltage in the at least one line is less than the presettable threshold value.

11. the switching device of claim 1, further comprising a delay circuit which disables the line-voltage-dependent electronic circuit for a presettable time interval after its activation.

12. The switching device of claim 11, wherein the presettable time interval is between about 1 and about 100 msec.

13. The switching device of claim 11, wherein the delay circuit bypasses the line-voltage-dependent electronic circuit during the presettable time interval.

14. The switching device of claim 11, wherein the delay circuit is a line-voltage-independent delay circuit.

15. The switching device of claim 1, wherein the line-voltage-dependent electronic circuit is configured to adapt a threshold value of a residual trigger current in a predeterminable time interval.

16. The switching device of claim 1, wherein the switching device is a residual-current-operated protective device or combination switch.

17. The switching device of claim 1, wherein the line-voltage-independent trigger element comprises a trigger relay.

* * * * *